(12) United States Patent
Hong

(10) Patent No.: US 10,900,751 B1
(45) Date of Patent: Jan. 26, 2021

(54) BORON ALUMINUM MAGNESIUM AND BORON CARBIDE COMPOSITIONS AND ARTICLES INCORPORATING SUCH COMPOSITIONS

(71) Applicant: NEW TECH CERAMICS, INC., Boone, IA (US)

(72) Inventor: Peter Hong, Boone, IA (US)

(73) Assignee: NEW TECH CERAMICS, INC, Boone, IA (US)

( * ) Notice: Subject to any disclaimer, the term of this patent is extended or adjusted under 35 U.S.C. 154(b) by 117 days.

(21) Appl. No.: 15/826,328

(22) Filed: Nov. 29, 2017

Related U.S. Application Data

(60) Provisional application No. 62/427,667, filed on Nov. 29, 2016.

(51) Int. Cl.
| | | |
|---|---|---|
| *F41H 5/04* | (2006.01) | |
| *C04B 35/563* | (2006.01) | |
| *B28B 11/24* | (2006.01) | |

(52) U.S. Cl.
CPC .......... *F41H 5/0435* (2013.01); *B28B 11/243* (2013.01); *C04B 35/563* (2013.01); *C04B 2235/3808* (2013.01)

(58) Field of Classification Search
CPC ... C22C 21/06; C22C 21/003; F16C 2204/20; F16C 2204/60; F16C 9/02; C22F 1/04; C22F 1/047; C23C 14/165; C23C 14/34; B32B 15/012
See application file for complete search history.

(56) References Cited

U.S. PATENT DOCUMENTS

| | | | |
|---|---|---|---|
| 7,419,925 B1 * | 9/2008 | Nunn .................... | C04B 35/563 501/87 |
| 2010/0028641 A1 * | 2/2010 | Zhu ...................... | C23C 14/0605 428/220 |
| 2011/0168451 A1 * | 7/2011 | DiGiovanni ............ | E21B 10/22 175/372 |
| 2016/0238348 A1 * | 8/2016 | Bottiglieri ............. | C04B 35/645 |
| 2017/0363393 A1 * | 12/2017 | Ganor ................... | F41H 5/0428 |

* cited by examiner

*Primary Examiner* — Daniel J. Schleis
*Assistant Examiner* — Kevin C T Li
(74) *Attorney, Agent, or Firm* — Nyemaster Goode, P.C.

(57) ABSTRACT

A ballistic protective composition having a sintered product of boron carbide and BAM where the sintered product includes up to about 80% BAM by weight based on the weight of the total BAM and boron carbide and wherein the sintered product is configured to prevent penetration of a ballistic threat through the sintered product. The ballistic protective composition may also be bonded to a ballistically protective fabric material to form a ballistic composite, which may be a wearable material, such as a body armor article.

20 Claims, 2 Drawing Sheets

BORON ALUMINUM MAGNESIUM AND BORON CARBIDE COMPOSITIONS AND ARTICLES INCORPORATING SUCH COMPOSITIONS

CROSS-REFERENCE TO RELATED APPLICATION

This application claims the benefit of U.S. Provisional Application Ser. No. 62/427,667, filed on Nov. 29, 2016, entitled Boron Aluminum Magnesium and Boron Carbide Compositions and Articles Incorporating Such Compositions, the disclosure of which is hereby incorporated by reference in its entirety.

FIELD OF THE DISCLOSURE

The present disclosure is generally directed toward compositions that include an ultrahard (about 25 GPa or greater, more typically from about 28 to 32 GPa) boride based ceramic material, $AlMgB_{14}$, known as BAM, with added boron carbide ($B_4C$), which has similar hardness. The disclosure is especially directed to those compositions where the BAM and boron carbide are sintered, either with or without pressure, with one another to form the compositions of the present disclosure. The present disclosure also relates to compositions with a plurality of layers bonded or fused by sintering together where one of the layers is boron carbide and another layer is BAM. The layers typically alternate with one another when a plurality of layers are employed. The present disclosure is also generally directed to the use of such sintered compositions in protecting against ballistic threats.

BACKGROUND OF THE DISCLOSURE

Various challenges exist when developing products and material that protect soldiers. One is to protect the soldier on the ground with minimum fatigue associated with carrying a body armor. There is also a high priority and urgency to reduce an overall weight of the body armor protection jacket by at least 10%.

$B_4C$ is one of the hardest known materials, ranked third behind diamond and cubic boron nitride. In addition, it is very light weight as compared to other hard candidate materials including Aluminum-Oxide ($Al_2O_3$), Titanium-Carbide (TiC) and Silicon-Carbide (SiC). Low density $B_4C$ ceramic materials have been shown to provide a high level of ballistic protection. Comparison of various physical properties of different candidate materials is shown in Table I. The Measured hardness of the BAM ($AlMgB_{14}$) material in Table I was for large particle sintered material.

TABLE I

Physical properties of selected ceramic materials

| Material | Density gm/cc | Hardness VHN (kg · mm)** | Measured Hardness (VHN) At PSU | % Wt. Saving (over $Al_2O_3$) |
|---|---|---|---|---|
| $B_6O$ | 2.56 | 3200-3400 (32-34 GPa) | — | |
| $B_6O$-40%$B_4C$ | 2.54 | 4700 (47GPa) | — | |
| $B_4C$ | 2.52 | 2900-3500 (29-35 GPa) | 3200-3400 | 36 |
| $AlMgB_{14}$ | 2.59 | 2600-2800 | 2500-2600 | 34 |

TABLE I-continued

Physical properties of selected ceramic materials

| Material | Density gm/cc | Hardness VHN (kg · mm)** | Measured Hardness (VHN) At PSU | % Wt. Saving (over $Al_2O_3$) |
|---|---|---|---|---|
| | | (27-28 GPa) | | |
| $AlMgB_{14}$ + 15%$TiB_2$ | 2.88 | 4600-4700 (46 GPa) | 2800-3000 | 26 |
| $AlMgB_{14}$ + 30%$TiB_2$ | 3.17 | 4600-4700 (46 GPa) | 2800-3000 | 20 |
| SiC | 3.1 | 2800-3000 | 2800-3000 | 21 |
| $Al_2O_3$ | 3.93 | 1500-2000 | | |
| $TiB_2$ | 4.52 | 2700-3700 | | |

Significant progress has been made in the development of ceramic tiles for ballistic applications. Ceramic tiles bear major impact load (>80-90%) for armor protection applications and the remaining impact load is transferred to a backing material. In order to improve the performance of ceramic tiles it is necessary to understand the failure mechanisms associated with the ballistic materials. It is believed that the failure mechanism of the ceramic tiles under dynamic load occurs in three stages. The first stage is associated with the projectile striking on the ceramic tile face generating significant amounts of compressive waves that nucleate defects. There is an incubation period during which the defects cluster and grow. The second stage is referred to as dwell time, in which clusters of defect coalesce, i.e., growth to defects followed by crack propagation leading to the third stage which is characterized by a failure mode. In the ceramic materials, once the cracks are generated, they propagate rapidly due to poor fracture toughness.

When designing advanced body armor protection, three performance improvement goals exist: (1) delay the dwell time by changing the crack coalescence, growth and propagation; (2) increasing the erosion of the projectile by the striking face, i.e. much harder surface; and (3) diffuse incoming focused energy or compressive shock waves. Changing the chemistry of the ceramic material and enhancing its fracture toughness and ductility without sacrificing the hardness and weight by making use of functional graded or new architecture of composite ceramic tiles may improve these performance characteristics. The top striking face plate must have a high fracture toughness and hardness that should erode a projectile. The subsequent cross section thickness should be a composite or laminated structure that should be able to delay the dwell time and provide structural support for multi hit capability.

In spite of significant progress made in the development of ceramic tiles for body armor protection applications in the past, the major factors that contribute to enhance ballistic performance are yet to be completely understood. For example, increasing the hardness and toughness generally improves ballistic performance. The impact of a high velocity projectile on a ceramic tile results in an extremely high strain rate condition. Significantly, the behavior of ceramic materials used for ballistic applications under high strain rate conditions cannot be predicted from their physical and mechanical properties. For example, it has been successfully demonstrated that the toughness of SiC can be significantly improved by the addition of an aluminum-boron-carbon sintering agent. However, the improved toughness has failed to improve its ballistic performance. The dependence of hardness, fracture toughness and high strain rate characteristics on the grain size has not been examined for ceramic materials used for ballistic application. Hardness is a function of both the strength of the interatomic bonding and the rigidity of the lattice framework.

According to the armor community, the general hallmarks of a good armor system are the low cost, low density, high hardness and good fracture toughness. However, the factors that create an improved ballistic protection material are unpredictable. Given the unpredictable nature of this art, actual testing of a new material is necessary to prove improved ballistic performance of any material.

Lightweight body armor plates that integrate hot pressed boron carbide and silicon carbide ceramic have been produced and integrated into articles of clothing. These plates can be produced into custom shares and curvatures to meet specific requirements. The boron carbide and silicon carbide ceramics have been tested against a full spectrum of ball and armor piercing ballistic threats from 5.56 to 7.62 millimeters.

While such boron carbide and silicon carbide ceramic materials have been produced and generally found to be acceptable to protect humans and animals from ballistic threats, improved compositions that exhibit superior or equivalent ballistic protection and more wearability, i.e. lighter and easier to move in when clothed with an article incorporating such compositions is desirable.

Additionally, BAM ceramics as well as titanium dioxide and BAM ceramics have been produced and evaluated. BAM has been combined with titanium dioxide. Titanium dioxide is added to the material to increase hardness and temperature tolerance. The hardness of both BAM ceramics and BAM and titanium diborate ceramics were significantly lower than boron carbide containing ballistic threat resistant materials, which are susceptible to tungsten carbide ballistic threats.

SUMMARY

One aspect of the present disclosure includes a ballistic protective composition having a sintered product of boron carbide and BAM where the sintered product includes up to about 80% BAM by weight based on the weight of the total BAM and boron carbide and wherein the sintered product is configured to prevent penetration of a ballistic threat through the sintered product.

Another aspect of the present disclosure is generally directed to a ballistic protective composite having a substrate material; and a sintered product of boron carbide and BAM operably coupled to the substrate material.

Another aspect of the present disclosure is generally directed to a process of forming a ballistic threat protective material that includes the following steps: providing BAM and boron carbide; mixing the BAM and boron carbide to form a commingled mixture; and sintering the commingled mixture to form a ballistic threat protective sintered material.

Yet another aspect of the present disclosure is generally directed to a process for forming a layered ballistic threat protective material that includes the step of bonding, adhering or sintering a boron carbide sheet or tile to a BAM sheet or tile to form at least a two layer ballistic threat protective material. Other additional layers may also be included such as other boron carbide or BAM layers and/or layers of ballistically protective fabrics as discussed herein, which may be bonded or adhered to the metallic layers.

Another aspect of the present disclosure includes a ballistic protective composite material having a layer of boron carbide material bonded to or sintered to a separate layer of BAM material. The ballistic protective composite material can stop at least two projectiles that impact the same or substantially the same location on the composite material from penetrating the composite material. The at least two projectiles may each individually have an energy level as high as of from about 13,200 ft·lbf to about 14,900 or about 15,000 ft·lbf.

Another aspect of the present disclosure includes a ballistic protective composite material having a layer of boron carbide material bonded to or sintered to a separate layer of BAM material wherein the ballistic protective composite material stops at least two projectiles that impact the same or substantially the same location on the composite material from penetrating the composite material when the at least two projectiles each individually have an energy level of from about 13,200 ft·lbf to about 15,000 ft·lbf.

Yet another aspect of the present disclosure is generally directed to a ballistic protective material that includes a ceramic material that is either: (1) a monolithic, sintered ceramic substrate comprising a boron carbide and a BAM; or (2) a multi-layered sintered ceramic substrate comprising a first layer comprising BAM and a second layer disposed on the first layer wherein the second layer includes the boron carbide. The ceramic material typically includes up to about 80% BAM by weight based on the weight of the total of the BAM and the boron carbide. The ceramic material has a density of from about 2.4 gm/cc to about 2.6 gm/cc. The ballistic protection material may be a tile or plate material or other shaped material.

Another aspect of the present disclosure is generally directed to a ballistic protective material. The ballistic protective material is a ceramic material that is either: (1) a monolithic, sintered ceramic substrate comprising a boron carbide and a BAM; or (2) a multi-layered sintered ceramic substrate including a first layer comprising BAM and a second layer disposed on the first layer where the second layer includes the boron carbide. The ceramic material does not experience shear amorphization when impacted by a tungsten carbide projectile.

Another aspect of the disclosure generally relates to a ballistic protective composite material that includes: a ceramic material that is either: (1) a monolithic, sintered ceramic substrate comprising a boron carbide and a BAM; or (2) a multi-layered sintered ceramic substrate comprising a first layer comprising BAM and a second layer disposed on the first layer wherein the second layer includes the boron carbide. The ballistic protective composite material stops at least two projectiles that impact the same or substantially the same location on the composite material from penetrating the composite material when the at least two projectiles each individually have an energy level of from about 13,200 ft·lbf to about 14,900 ft·lbf. The projectiles that are stopped may be tungsten carbide projectiles.

These and other aspects, objects, and features of the present disclosure will be understood and appreciated by those skilled in the art upon studying the following specification, claims, and appended drawings.

DETAILED DESCRIPTION OF EMBODIMENTS

Figure 1:
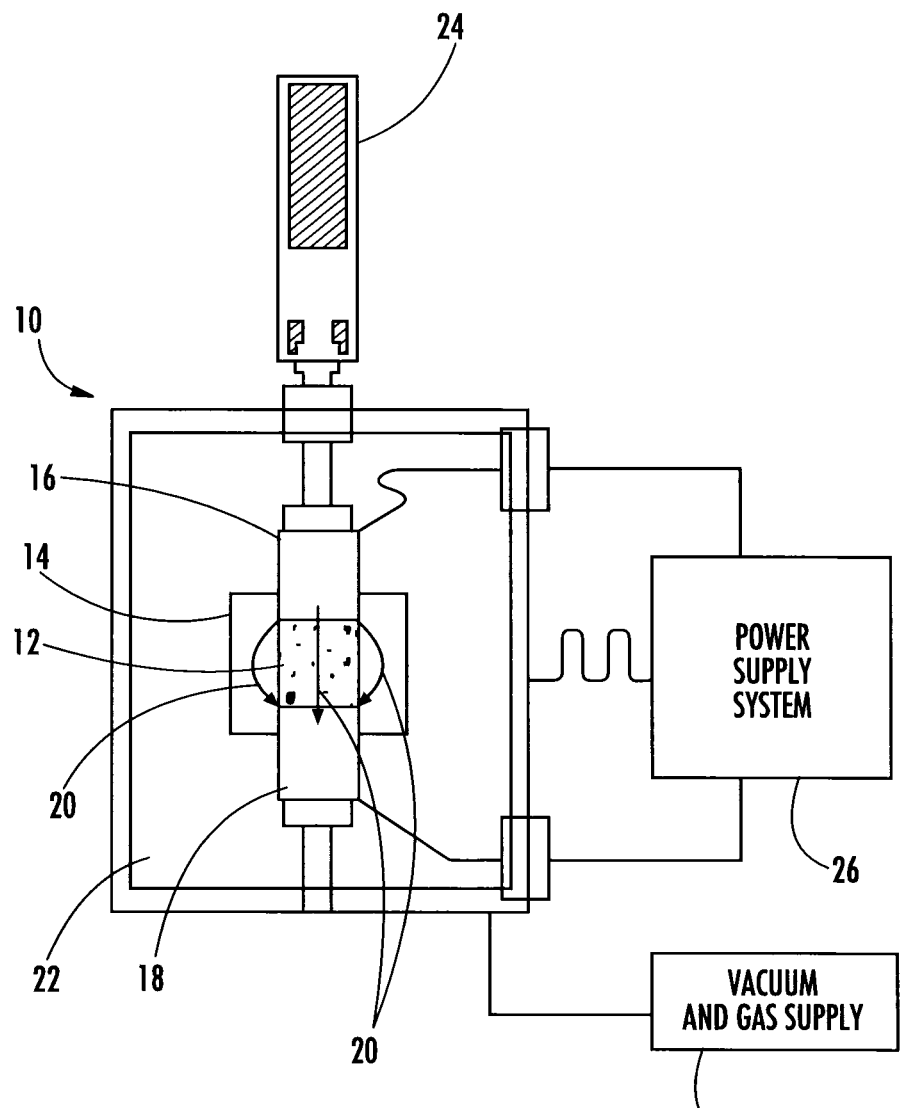
FIG. 1 is a schematic view of the system used to sinter the boride based ceramic material, $AlMgB_{14}$, known as BAM, with added boron carbide ($B_4C$)

It is to be further understood that all terminology used herein is for the purpose of describing particular embodiments only, and is not intended to be limiting in any manner or scope. For example, as used herein the singular forms "a," "an," and "the" can include plural referents unless the content clearly indicates otherwise. Additionally, all units, prefixes, and symbols may be denoted in its SI accepted form. Numeric ranges recited within the specification are inclusive of the numbers defining the range and include each integer and fraction within the defined range. Throughout this disclosure, various aspects of the disclosure and the claimed invention are presented in a range format. It should be understood that the description in range format is merely for convenience and brevity and should not be construed as an inflexible limitation on the scope of the disclosure or the claimed invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 5, from 2 to 6, from 3 to 6 etc., as well as individual numbers within that range, for example: 1, 2, 3, 4, 5, and 6. This applies regardless of the breadth of the range. References to elements herein are intended to encompass any or all of their oxidative states and isotopes. For example, discussion of aluminum can include $Al^I$, $Al^{II}$, or $Al^{III}$ and references to boron include any of its isotopes, i.e., $^6B$, $^7B$, $^8B$, $^9B$, $^{10}B$, $^{11}B$, $^{12}B$, $^{13}B$, $^{14}B$, $^{15}B$, $^{16}B$, $^{17}B$, $^{18}B$, and $^{19}B$.

As used herein, the term "BAM" means and includes a ceramic including boron, aluminum, and magnesium. For example, BAM may include $AlMgB_{14}$, $Al_{0.75}Mg_{0.78}B_{14}$, and materials having other ratios of boron, aluminum, and magnesium. Further, BAM can be varied by the weight percent and/or ratios of the aluminum, boron, and magnesium. While the primary isotope of boron used in BAM is B(14), BAM includes any other isotopes of boron although for ease in nomenclature only the B(14) isotope will be referenced herein. BAM and methods of preparing BAM are described in U.S. Pat. Nos. 6,099,605 and 6,432,855 the disclosures of which are hereby incorporated by reference in their entireties. In some embodiments, BAM can include additional ceramics and/or ceramic alloys (X), wherein X can be, for example, a ceramic comprising Group III, IV, V, and VI elements, and borides or nitrides derived from them. Preferred ceramics and/or ceramic alloys (X) include those comprising aluminum, cobalt, hafnium, iron, magnesium, molybdenum, nickel, oxygen, phosphorous, silicon, sulfur, tantalum, titanium, tungsten, vanadium, and/or zirconium. Examples of ceramics and ceramic alloys that can be included in BAM formulations are described in U.S. Pat. No. 7,517,375 the disclosure of which is hereby incorporated by reference in its entirety. Preferred ceramics and/or ceramic alloys (X) for addition to BAM include, but are not limited to, TiN, TiCN, TiC, TiB, $Tib_2$, ZrC, ZrN, $ZrB_2$, HfC, HfC, HfN, $HfB_2$, $TaB_2$, VC, VN, BN, $Al_2O_3$, $Si_3N_4$, $SiB_6$, SiAlCB, $B_4C$, $B_2O_3$, $W_2B_5$, $WB_2$, $WS_2$, AlN, $MoS_2$, $MoSi_2$, $M_2B_5$, and $MoB_2$, including any of their polymorphs and amorphous forms (e.g., BN is inclusive of amorphous boron nitride (a-BN), cubic boron nitride (c-BN), and hexagonal boron nitride (h-BN)). X is typically combined with the $AlMgB_{14}$ material during the material formulation process; however, they can be combined at any time prior to or during cladding. Ceramics that include both BAM and X can be referred to as BAM or BAM/X. Alternatively, BAM can refer to ceramics comprising boron, aluminum, and magnesium that do not include other ceramics or ceramic alloys. Preferred BAM are $AlMgB_{14}$ BAM:$TiB_2$, and BAM:TiB.

The BAM can be provided in any form, including as a powder, paste, and/or slurry. The BAM can then be mixed and/or blended with other powders. In a preferred embodiment, the BAM is a powder. Any powder formulations of BAM can be used, including for example, agglomerated, densified, reacted, sintered, and/or spray-dried BAM. The BAM particles typically range from 1 µm to 500 µm, but may also be used as particles larger than 500 µm. It is expected that smaller BAM particles (less than 1 µm) could also be employed.

Hard materials can be generally classified into two categories: intrinsic compounds and extrinsic compounds. The intrinsic group includes diamond, cubic boron nitride (c-BN), carbon nitrides and ternary compounds such as B—N—C, which possess an innate hardness. Conversely, extrinsic materials, which include both BAM and boron carbide, are those that have hardness and other mechanical properties that are determined by their microstructure rather than composition. In the case of BAM, the hardness can be manipulated by the processing of the material. Typically the use of BAM of smaller particle size makes a harder material. In the case of the combination of BAM and boron carbide, the particle size of the BAM material affects the hardness of the composite material and it has also been surprising found that BAM is a grain growth inhibitor of boron carbide such that synergistic hardness and other properties are achieved. Essentially, the toughness and flexing properties of the BAM material are shared with the boron carbide material.

BAM powder of the present disclosure is combined with boron carbide ($B_4C$) and thereafter sintered to produce a sintered product of the present disclosure, which can be used as a ballistic threat protection material. Boron Carbide is an extremely hard boron-carbon ceramic, and covalent material. Boron carbide has a Vickers Hardness of >30 MPa, it is one of the hardest known materials. It has a density of 2.52 g/cm3; a melting point of 2445° C.

Boron carbide has a complex crystal structure typical of icosahedron-based borides. There, $B_{12}$ icosahedra form a rhombohedral lattice unit surrounding a C—B—C chain that resides at the center of the unit cell, and both carbon atoms bridge the neighboring three icosahedra. This structure is layered. The $B_{12}$ icosahedra and bridging carbons form a network plane that spreads parallel to the c-plane and stacks along the c-axis. The lattice has two basic structure units— the $B_{12}$ icosahedron and the $B_6$ octahedron. Because of the small size of the $B_6$ octahedra, they cannot interconnect. Instead, they bond to the $B_{12}$ icosahedra in the neighboring layer, and this decreases bonding strength in the c-plane.

Because of the $B_{12}$ structural unit, the chemical formula of "ideal" boron carbide is often written not as $B_4C$, but as $B_{12}C_3$, and the carbon deficiency of boron carbide described in terms of a combination of the $B_{12}C_3$ and $B_{12}C\neg_2$ units. One or more carbon atoms may be incorporated into the boron icosahedra, giving rise to formulas such as $(B_{11}C)$ CBC=$B_4C$ at the carbon-heavy end of the stoichiometry, but formulas such as $B_{12}(CBB)$=$B_{14}C$ at the boron-rich end. As a result, "boron carbide" is not a single compound, but a family of compounds of different compositions. A common intermediate, which approximates a commonly found ratio of elements is $B_{12}(CBC)$=$B_{6.5}C$.

Boron carbide is known as a robust material having high hardness. Its Vickers Hardness (at least 30 GPa), Elastic Modulus (460 GPa) and fracture toughness (3.5 MPa·m1/2)

approach the corresponding values for diamond (1150 GPa and 5.3 MPa·m1/2). Boron carbide is a semiconductor, with electronic properties dominated by hopping-type transport.

In the case of the present disclosure, the BAM can be mixed and/or blended with the Boron Carbide prior to feeding through a powder feeder (by physical mixing/stirring), or they can be mixed and/or blended by feeding the individual powders through separate powder feed hoppers, where they blend as they are carried to the process through a powder delivery line. Thereafter, the blend is sintered, typically by Spark Plasma Sintering, Hot Press Sintering or Pressure-less Sintering, which is done for products having complex shapes and formed parts.

Spark Plasma Sintering is also known as Field Assisted Sintering Technology (FAST). In such sintering, high temperature ceramics are sintered using a relatively short processing cycle at lower temperatures. The technique is also sometimes referred to as pulsed electric current sintering (PECS). In this type of process, powder is generally compacted within a graphite die while simultaneously under a high density current, pressure (i.e., load) and temperature. Part of the high density current passes through the powder providing an instant joule heating to high temperature and contributing to high rate diffusion and joining of grains under the load. Because the powder is under concurrent load and temperature, the processing cycle takes minutes to sinter the product to near theoretical density (close to 100%), while allowing little or no grain growth to occur.

The schematic diagram of a FAST system 10 is shown in FIG. 1. The powder material 12 to be sintered is contained in the graphite die 14 through which pressure is applied via an upper punch 16 and lower punch 18. The continuous or pulsed DC current flows through the punches and the die. The current through the die provides radiant heating to the power while the current 20 flowing through the powder produces instant Joule heating. Current flows through the least resistant area. However, if there is resistance between current paths, the localized area is heated rapidly, which results in melting, vaporization and possibly plasma formation depending upon material properties. Combining the effect of pressure, temperature and localized heating at the grain boundaries results in a high sintering rate. The die 14 is typically positioned within a water cooled vacuum chamber 22. A hydraulic system 24, a pulse power supply system 26, and a vacuum and gas supply system 28 are also typically employed in the FAST system 10.

There are three major process variables, the high density current that can be applied concurrently during compaction and sintering of the powder, the temperature, and the pressure. It is believed that the role of current is very important to sintering. During the compaction process, the direct current can be applied in various modes from continuous to pulsed modes with different frequencies from 0 to 300 kHz. The pulse duration and the paused duration can also be varied. The selection of the current density, pulse duration and amplitude will depend on the material property and size of the powder particles. Larger industrial sized systems may only apply current in a continuous mode due to the larger amounts of powder in the graphite die. As the volume (size of the component) increases, the heat rate must be adjusted to provide enough time for porosity to migrate out. In addition, the graphite die generally requires good insulation to minimize temperature gradients.

During the FAST process, it is believed that when high density current passes through the graphite mold and the powder, part of the current is consumed by the graphite mold resulting in an elevated temperature. Since part of the current also passes through the powder that provides the instant Joule heating, this enhances surface diffusion and contributes toward a high sintering rate at a relatively low temperature (compared to conventional sintering).

While Field Assisted Sintering Technology (FAST) may be used, other hot press sintering techniques may also be used. Hot pressing is generally a high-pressure, low-strain powder metallurgy process at high enough temperature to induce sintering. The sintering is achieved by the simultaneous application of heat and pressure. The heat may be provided inductive heating, indirect resistance heating, or direct hot pressing using the FAST technique as discussed above. When inductive heating is used, heat is typically produced within the mold when it is subjected to a high frequency electromagnetic field generated using an induction coil coupled to an electric generator. The mold is made out of graphite or steel and pressure is applied by one or two cylinders onto the punches. The mold is positioned within the inductive coil. One advantage of using inducting heating is that the pressure and inductive powder are completely independent. Additionally, this process may be used with powders with a liquid phase. Low pressures are also possible.

Indirect resistance heating utilizes a mold placed in a heating chamber. The chamber is heated by graphite heating elements that are heated using electric current. The heat is then transferred into the mold by convection. As the electrical energy heats the heating elements, the mold is heated in a secondary manner, which is why the process is called indirect resistance heating. High temperatures are achievable using this method and the temperatures are independent from the conductivity of the mold and independent from heat and pressure.

In addition to the sintering methods discussed above, the present materials may also be sintered using a pressure-less sintering process. This process has advantages making formed parts and components from the material as opposed to simply making generally planar composite materials. Pressure-less sintering is sintering where the sintering of the BAM and boron carbide powder is achieved at elevated temperatures without applied pressure. The powder compact can be created by slip casting, injection molding, and cold isostatic pressing. After pre-sintering, the compact can be machined to its final shape before sintering. Different heating schedules can be performed with pressure-less sintering. A constant rate of heating, a rate-controlled sintering, and a two-step sintering process may be employed.

The ratio of BAM to boron carbide may be varied and it is presently believed that the amount of BAM, while typically between about 20% by volume of the combination of BAM and boron carbide to 40% by volume may be used in higher amounts up to 60% or 80% of the total powder mixture. The tiles produced by the process of the present invention incorporating BAM and boron carbide may be used as ballistic protective armor tiles in combination with a support structure material that typically also is ballistically protective. Such ballistically protective substrate materials may include KEVLAR® or DYNEEMA®. The tiles produced are typically bonded by a proprietary process to the substrate material. There are companies known to provide various proprietary bonding processes for bonding ballistically protective ceramic tile materials to a substrate fabric material, which is also typically ballistically protective. Those companies include: BAE Systems, Inc. of Arlington, Va.; Ceradyne, a division of 3M® of St. Paul, Minn.; and TenCate of the Netherlands.

In one aspect of the present disclosure, four to five ceramic insert tiles (monolith) are inserted or otherwise bonded to the KEVLAR® or other ballistically protective substrate material to create a ballistic protective article capable of being worn by a human or animal. This is somewhat of a chainmail type of construction. KEVLAR® is a para-aramid synthetic fiber produced by DuPont®. It is a brand of poly-paraphenylene terephthalamide. The sintered composite materials or the layered composite with BAM and boron carbide layers of the present disclosure may be used for other materials then simply monolith/tiles for body armor. Some other uses include: an article of clothing for a human or animal including, but not limited to helmets, guards, shin guards, knee protection devices, elbow protection devices; enclosures for electronics, such as computers, sensors and other sensitive instrumentation; guard plates on the bottom of vehicles; and airplane components subject to potential impact including, for example, tips on turbine engine blades. Some of the above items are able to be produced by pressure-less sintering using the boron carbide and BAM powders of the present disclosure to form shaped composites, which would not have been produced using just boron carbide. Each of these may either be outright produced by the process of the present invention or produce components that may be incorporated into these components. In particular, the materials that require shape forming may be uniquely producible using the compounds of the present disclosure through pressure-less sintering. Instead of producing a generally planar piece of material that is incorporated into the overall body armor, Applicants believe it may be possible to produce shaped components at lighter weight with as good or better impact resistance.

In the case of guard plates for vehicles, it has surprisingly been discovered that the ballatic tiles of the present disclosure perform better when engaged to a fiber material as discussed above in connection with wearable protective systems and that overall system thereafter bonded to a metal vehicle part in the same or similar manner as described above for engaging the tiles of the present disclosure to the fiber backing materials. The composite may also be adhered using an aerospace adhesive. The most common types of aerospace adhesives are Anaerobics, Structural Acrylics, Epoxies, Cyanoacrylates, as well as adhesive tapes and films. These are all common aerospace adhesives.

Dyneema™ fiber is a gel-spun, multi-filament fiber that is created from ultra high molecular weight polyethylene (UHMWPE). Also known as high-modulus polyethylene, (HMPE), or high performance polyethylene (HPPE), it has extremely long chains, with a molecular mass usually between 3.5 and 7.5 million amu. The longer chain serves to transfer load more effectively to the polymer backbone by strengthening intermolecular interactions. UHMWPE is a type of polyolefin. It is made up of extremely long chains of polyethylene, which all align in the same direction. It derives its strength largely from the length of each individual molecule (chain). Van der Waals bonds between the molecules are relatively weak for each atom of overlap between the molecules, but because the molecules are very long, large overlaps can exist, adding up to the ability to carry larger shear forces from molecule to molecule. Each chain is bonded to the others with so many van der Waals bonds that the whole of the inter-molecule strength is high. In this way, large tensile loads are not limited as much by the comparative weakness of each van der Waals bond. When formed to fibers, the polymer chains can attain a parallel orientation greater than 95% and a level of crystallinity from 39% to 75%. In contrast, KEVLAR® derives its strength from strong bonding between relatively short molecules.

UHMWPE is synthesized from monomer of ethylene, which are bonded together to form the base polyethylene product. These molecules are several orders of magnitude longer than those of familiar high-density polyethylene (HDPE) due to a synthesis process based on metallocene catalysts, resulting in UHMWPE molecules typically having 100,000 to 250,000 monomer units per molecule each compared to HDPE's 700 to 1,800 monomers. UHMWPE is processed variously by compression molding, ram extrusion, gel spinning, and sintering. In gel spinning a precisely heated gel of UHMWPE is extruded through a spinneret. The extrudate is drawn through the air and then cooled in a water bath. The end-result is a fiber with a high degree of molecular orientation, and therefore exceptional tensile strength. Gel spinning depends on isolating individual chain molecules in the solvent so that intermolecular entanglements are minimal. Entanglements make chain orientation more difficult, and lower the strength of the final product.

Figure 2:
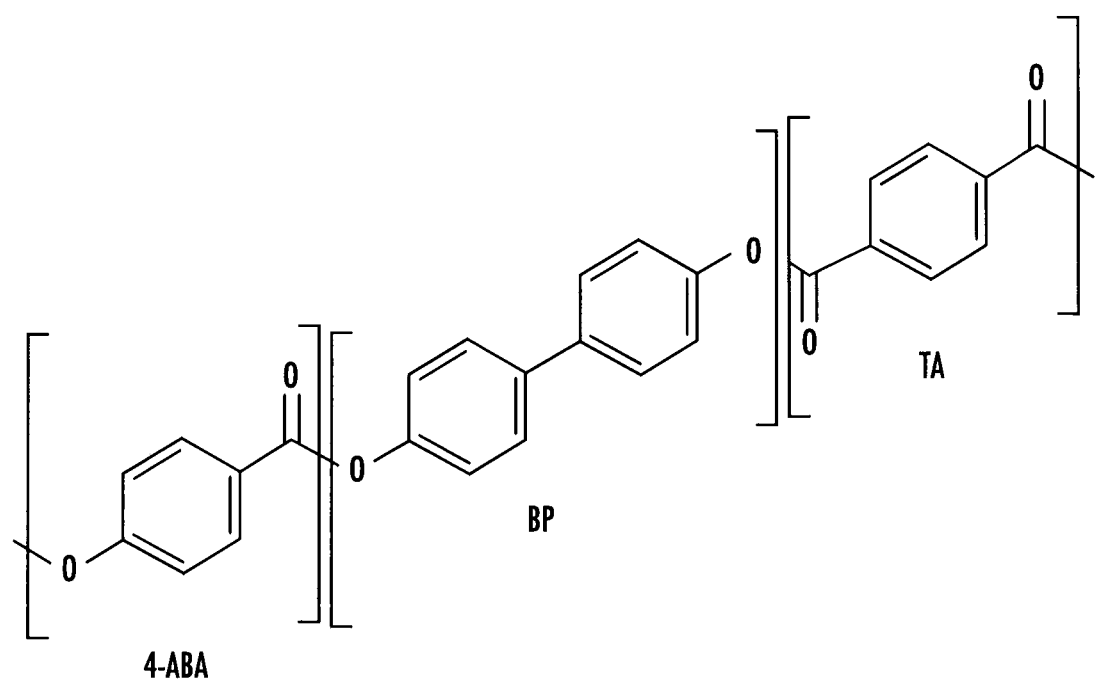
FIG. 2 is the chemical structure of a fiber material that is formed of aromatic polyester fibers that forms a backing material.

In addition to the UHMWPE and poly-paraphenylene terephthalamide, other ballistic protective fibrous materials can be used. One such other fiber material are aromatic polyester fibers such as those produced by ATSP Innovations. Such fiber filaments may be of the structure shown in FIG. 2 where 4-ABA 4-acetoxybenzoic acid, BP is biphenol diacetate, and TA is terephthalic acid. The aromatic polyester fibers typically have a density of about 1.4 g/cc or less; a tensile strength of about 3.0 GPa or higher or, more typically about 3.8 GPa or higher; a Tensile Modulus of about 160 GPa or higher or more typically about 165 GPa or higher; an elongation percentage of about 3.0 or higher; and a moisture absorption percentage of about 0. A comparison of KEVLAR® to aromatic polyester fibers is shown below:

| Fiber Comparison | | |
|---|---|---|
| | KEVLAR® 49 | AP fiber |
| Density (g/cc) | 1.45 | 1.40 |
| Tensile Strength (GPa) | 2.76 | 3.79 |
| Tensile Modulus (GPa) | 137.9 | 165.5 |
| Elongation (%) | 2.7 | 3.0 |
| Moisture Absorption (%) | 2.0 | 0.01 |

Applicants have sintered boron carbide and BAM together with BAM at 40% by volume and 20% by volume where the sintering was done at approximately 1700° C. The resulting sintered composite characteristics are shown in the chart below.

| Material | Temp C. | Powder wt. gm | Dry wt. gm | Material Lost gm | sub. wt. gm | Arch Den. gm/cc | Density % | Theor. Den. gm/cc | Thick mm |
|---|---|---|---|---|---|---|---|---|---|
| 100% BAM (AlmgB154) | 1450 | 20.7 | 20.555 | 0.145 | 13.543 | 2.931 | 106.6 | 2.75 | 6.64 |

-continued

| Material | Temp C. | Powder wt. gm | Dry wt. gm | Material Lost gm | sub. wt. gm | Arch Den. gm/cc | Density % | Theor. Den. gm/cc | Thick mm |
| --- | --- | --- | --- | --- | --- | --- | --- | --- | --- |
| B4C submicron + 40% vol. BAM | 1500 | 19.7 | 19.322 | 0.378 | 11.645 | 2.517 | 96.4 | 2.61 | 8.77 |
| B4C submicron + 40% vol. BAM | 1600 | 19.7 | 19.254 | 0.446 | 11.703 | 2.550 | 97.7 | 2.61 | 7.99 |
| B4C submicron + 20% vol. BAM | 1700 | 19.3 | 19.059 | 0.241 | 11.403 | 2.489 | 96.9 | 2.57 | 6.51 |
| B4C submicron + 20% vol. BAM | 1750 | 19.3 | 19.219 | 0.081 | 11.577 | 2.515 | 97.9 | 2.57 | 6.21 |

Applicant presently believes higher amounts of BAM may be employed, including up to 80% by weight of the combination of the BAM and boron carbide or possibly higher.

As discussed briefly above, the present disclosure also relates to compositions with a plurality of layers bonded or fused by sintering together where one of the layers is boron carbide and another layer is BAM. It is possible to have discrete layers of the boron carbide and BAM. Optionally, the KEVLAR® or DYNEEMA® or other ballistic threat resistance material, which may be a fabric material, may be placed as backing material for the discrete layers of materials regardless of the layers of material. The fabric material facilitates the prevention of crack propagation of the ceramic, which could be in layered form or blended ceramic material form of the combination of BAM and boron carbide. The fabric material may provide its protective benefits, but is also believed to provide elasticity to potentially cushion impact that occurs when a ballistic threat impacts the surface of such a layered composite.

Previously, a boron carbide ballistic threat material that was not sintered with BAM or contained a separate BAM layer of material needed to be at least about one inch thick to stop a .30-06 cartridge, which typically has a 10.8 gram projectile traveling at about 2880 ft/sec. Such a boron carbide only one inch thick material could stop such a projectile 100% of the time, but typically only stops a second such projectile about 60% of the time. It is believed that a boron carbide only ballistic material experiences a chemical reaction that causes a softening based on shear amorphization that often prevents the boron carbide only ceramic tile from stopping a second projectile, especially when that projectile contains tungsten carbide (WC), which is what is believed to create the chemical softening reaction resulting from the projectile striking the tile thereby causing a chemical interaction resulting the softening. Additionally, such boron carbide tiles will only weigh about 1.5 to 2.75 kg. The BAM and boron carbide composites of the present disclosure do not experience shear amorphization when impacted by a projectile that contains tungsten carbide. As such, the BAM and boron carbide composites are better able to stop a tungsten carbide projectile that impacts the same or substantially the same location a second time.

The BAM and boron carbide composites, whether layered or sintered together may be as little as 0.2 inch thick and stop a 50 caliber projectile traveling at from about 2,800 to about 3000 ft/sec and weighing from about 650 grams to about 800 grams. The 50 caliber projectiles may have an energy of from about 13,200 ft·lbf to about 15,000 ft·lbf. Additionally, the composites of the present disclosure will stop both an initial projectile and a subsequent projectile. As such, a lighter weight (the material is less dense) material may be used at about one fifth of the thickness (typically about 0.20 inch to about 0.24 inch) and stop a higher threat level projectile than previously possible using just a boron carbide material. The ballistic energy of a .30-06 projectile is typically between about 2,000 and about 3,400 ft·lbf and a 50 caliber energy is typically between about 13,200 ft·lbf to about 14,900 ft·lbf. Also, very significantly, BAM and boron carbide composites, while being lighter and slightly less hard, are tougher and do not experience shear amorphization like boron carbide only ceramic tiles.

The sintered ceramic materials of the present disclosure (either monolithic or layered) employing both BAM and boron carbide may further be employed with layers of ceramic material with one or more fused layers of ceramic material formed entirely or at least substantially of BAM and/or one or more layer or layers of boron carbide ceramic material. For example, an outer layer may be entirely or substantially boron carbide; the next layer(s) may be either a monolithic material of BAM and boron carbide and/or a multilayer ceramic of BAM and boron carbide; and a user facing layer or layers, which can be an inner-facing later if protecting a vehicle, that is substantially or entirely comprised of BAM. Essentially, the layers may be in any combination of ceramic materials discussed herein that includes BAM and boron carbide alone and additional layer or layers of BAM and/or additional layer or layers of boron carbide. Any combination of layers may be used.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A ballistic protective material comprising:
a ceramic material that is either: (1) a monolithic, sintered ceramic substrate comprising a boron carbide and a BAM; or (2) a multi-layered sintered ceramic substrate comprising a first layer comprising BAM and a second layer disposed on the first layer wherein the second layer comprises the boron carbide;
wherein the ceramic material comprises from about 40% to about 80% BAM by weight based on the weight of the total of the BAM and the boron carbide; and
wherein the ceramic material has a density of from about 2.4 gm/cc to about 2.6 gm/cc.

2. The ballistic protective material of claim 1, wherein the ceramic material does not experience shear amorphization when impacted by a tungsten carbide projectile.

3. The ballistic protective material of claim 1, wherein the boron carbide is a boron carbide powder and wherein the ceramic material has a density of from 2.4 gm/cc to 2.61 gm/cc.

4. The ballistic protective material of claim 3, wherein the ceramic material has a total thickness of from about 6 mm to about 9 mm and is configured to stop multiple projectiles with an energy from about 13,200 ft·lbf to about 15,000 ft·lbf when impacting the same or about the same location on the ceramic material and wherein the ceramic material does not experience shear amorphization when impacted by a projectile.

5. The ballistic protective material of claim 4, wherein the ceramic material does not experience shear amorphization when impacted by a tungsten carbide projectile.

6. The ballistic protective material of claim 1, wherein the ballistic protective material consists of BAM and boron carbide.

7. The ballistic protective material of claim 1 further comprising a substrate material affixed to a back surface of the ceramic material such that the ceramic material cannot be disengaged from the substrate material by hand and without the use of tools.

8. The ballistic protective material of claim 7, wherein the boron carbide is a boron carbide ceramic prior to being formed into the ceramic material and the BAM is a BAM in a form chosen from the group consisting of a powder, a paste, a slurry or a combination thereof prior to being formed into the ceramic material.

9. The ballistic protective material of claim 8, wherein the ceramic material is a spark plasma sintered product having BAM in an amount of from about 40% to about 80% by weight of the total BAM powder and boron carbide powder used to produce the ceramic material.

10. The ballistic protective material of claim 7, wherein the substrate material is a ballistic threat protective material configured to stop at least two ballistic projectiles having an energy of up to about 14,900 ft·lbf and has a thickness of no greater than about 0.8 inch.

11. The ballistic protective material of claim 10, wherein the ballistic threat protective material is a poly-paraphenylene terephthalamide or an ultra high molecular weight, long chain polyethylene.

12. The ballistic protective material of claim 11, wherein the ceramic material is bonded to the ballistic threat protective material and remains in position on the ballistic threat protective material even after the ceramic material is impacted by a ballistic projectile having an energy of up to about 14,900 ft·lbf and wherein the ceramic material has a thickness of from about 0.2 to about 0.24 inch.

13. A ballistic protective material comprising:
a ceramic material that is a monolithic, sintered ceramic substrate comprising a boron carbide and a BAM wherein the ceramic material comprises the BAM in an amount of from 40% to 80% by weight of the ceramic material and boron carbide in an amount of from 40% to 80% of the ceramic material.

14. The ballistic protective material of claim 13, wherein the ceramic material has a density of from about 2.4 gm/cc to about 2.6 gm/cc and wherein the ceramic material does not experience shear amorphization when impacted by a tungsten carbide projectile.

15. The ballistic protective material of claim 14, wherein the ceramic material is bonded to the ballistic protective material and remains in position on the ballistic protective material even after the ceramic material is impacted by a ballistic projectile having an energy of up to about 14,900 ft·lbf and wherein the ceramic material has a thickness of from about 0.2 to about 0.24 inch.

16. The ballistic protective material of claim 15, wherein the ceramic material has a thickness of from about 6 mm to about 9 mm and will prevent penetration of at least two projectiles from a .30-06 cartridge that strike the same or approximately the same location on the ceramic material.

17. The ballistic protective material of claim 13, wherein a ballistic threat protective material that is a substrate is affixed to a back surface of one or more pieces of the ceramic material and wherein the ceramic material comprises the BAM in an amount of from 60% to 80% by weight of the ceramic material.

18. The ballistic protective material of claim 17, wherein the ballistic threat protective material is a poly-paraphenylene terephthalamide or an ultra high molecular weight, long chain polyethylene and wherein the ceramic material comprises BAM in an amount of from 60% to about 80 weight percent of the ceramic material.

19. A ballistic protective composite material comprising:
    a ceramic material that that is either: (1) a monolithic, sintered ceramic substrate consisting of a boron carbide and a BAM; or (2) a multi-layered sintered ceramic substrate comprising a first layer consisting of BAM and a second layer disposed on the first layer wherein the second layer consists of the boron carbide;
    wherein the ballistic protective composite material stops at least two projectiles that impact the same or substantially the same location on the ballistic protective composite material from penetrating the ballistic protective composite material when the at least two projectiles each individually have an energy level of from about 13,200 ft·lbf to about 14,900 ft·lbf.

20. The ballistic protective composite material of claim 19, wherein the at least two projectiles have a weight of from about 650 to about 800 grams and are tungsten carbide projectiles and wherein the BAM comprises 60% to 80% by weight of the ceramic material.

* * * * *